United States Patent
Padmanabhuni et al.

(10) Patent No.: US 8,104,078 B2
(45) Date of Patent: Jan. 24, 2012

(54) SYSTEM AND METHOD FOR PREVENTING SERVICE ORIENTED DENIAL OF SERVICE ATTACKS

(75) Inventors: Srinivas Padmanabhuni, Bangalore (IN); Abhishek Malay Chatterjee, Kolkata (IN); Vineet Singh, Kolkata (IN); Senthil Kumar Kumarasamy Mani, Chennai (IN)

(73) Assignee: Infosys Technologies, Ltd., Bangalore (IN)

( * ) Notice: Subject to any disclaimer, the term of this patent is extended or adjusted under 35 U.S.C. 154(b) by 1052 days.

(21) Appl. No.: 11/709,881

(22) Filed: Feb. 23, 2007

(65) Prior Publication Data
US 2008/0209539 A1 Aug. 28, 2008

(30) Foreign Application Priority Data
Feb. 23, 2006 (IN) .............................. 297/CHE/2006

(51) Int. Cl.
*G06F 15/173* (2006.01)
(52) U.S. Cl. .............. 726/12; 726/11; 726/14; 715/506; 711/108; 709/207; 707/5
(58) Field of Classification Search .................... 726/12, 726/14, 11
See application file for complete search history.

(56) References Cited

U.S. PATENT DOCUMENTS

| 7,299,317 B1 * | 11/2007 | Panigrahy et al. | 711/108 |
| 2005/0228984 A1 * | 10/2005 | Edery et al. | 713/153 |
| 2005/0268333 A1 * | 12/2005 | Betts et al. | 726/11 |
| 2006/0288270 A1 * | 12/2006 | Gaurav et al. | 715/506 |

OTHER PUBLICATIONS

Yumerefendi et al., Trust but Verify: Accountability for Network Services, Sep. 2004, ACM, EW 11.*
Bhargavan et al., An Advisor foe Web Services Security Policies, Nov. 11, 2005, ACM, sws '05.*
Bartel et al., XML-Signature Syntax and Processing, Feb. 12, 2002, The Internet Society & W3C.*

* cited by examiner

*Primary Examiner* — Vivek Srivastava
*Assistant Examiner* — Samuel Ambaye
(74) *Attorney, Agent, or Firm* — LeClairRyan, a Professional Company

(57) ABSTRACT

A method, system, and computer program product for preventing network service attacks, including processing a message to validate the message for message version and syntax via a security firewall; canonicalizing the message and extracting a message header and body via a converter; converting the body into a Patricia Trie via the converter; and validating the header and the converted body for security via a comparator.

19 Claims, 3 Drawing Sheets

SYSTEM AND METHOD FOR PREVENTING SERVICE ORIENTED DENIAL OF SERVICE ATTACKS

CROSS REFERENCE TO RELATED DOCUMENTS

This application claims priority under 35 U.S.C. §119 to Indian Patent Application Serial No. 297/CHE/2006 of PADMANABHUNI et al., entitled "SYSTEM AND METHOD FOR PREVENTING SERVICE ORIENTED DENIAL OF SERVICE ATTACKS," filed Feb. 23, 2006, the entire disclosure of which is hereby incorporated by reference herein.

BACKGROUND OF THE INVENTION

1. Field of the Invention

The present invention relates generally to security of software systems, and more particularly to a system, method, and software for protecting a computer system and network against XML, and the like, denial of service attacks.

2. Discussion of the Background

Web services have evolved over time in exposing the underlying applications to interact with its peers over any transport protocol, Hypertext Transfer Protocol (HTTP), Simple Mail Transfer Protocol (SMTP), etc. Simple Object Access Protocol (SOAP) describes efficiently how XML messages can be wrapped with SOAP envelope to communicate successfully between the service consumers and the providers irrespective of the underlying implementation. In normal scenario SOAP is sent over HTTP, a well known web protocol. Over the years, well established security mechanisms, such as Secure Socket Layer (SSL), along with encryption, decryption and digital certificates have provided the much needed security for HTTP based applications. However, these mechanisms fail to provide security to SOAP, as SOAP messages can be sent over any transport protocol. SSL by its nature provides confidentiality and authentication over a single point-to-point HTTP session and not over a complete channel, whereas the SOAP message is sent over HTTP in the first leg and over SMTP in the second. Hence, the need for securing the SOAP message directly, rather than relying on the transport layer to provide the security, led to standards, such as XML-Signature, XML-Encryption and WS-Security. These standards helped in providing the message level security, irrespective of the transport protocol chosen to deliver the SOAP messages.

In most cases, the SOAP messages were communicated from one application to another on behalf of some end user. Application based on Role Based Access required the user credentials. When these applications were exposed as services, there was a requirement for sending the end user credentials (name/password) and any other credentials as part of the SOAP message. Security Assertions Markup Language (SAML) standard helped in achieving the same.

Since most of the applications exposed as services were behind the enterprise firewall, the need for firewall to be SOAP aware was eminent. However, most of the firewalls allowed HTTP and email traffic and since SOAP was frequently sent on HTTP, SOAP message could carry anything and could successfully penetrate the enterprise firewall. XML firewalls helped in solving this issue by thorough content inspection of the SOAP payload, along with the XML schema validation of the XML payload inside the SOAP body.

All of these security mechanism help in preventing unauthorized and unauthenticated access to the services, but the security dimension does not end here. Denial of Service (DoS), is defined as "An explicit attempt by attackers to prevent legitimate users of a service from using that service." Web services by nature explicitly advertise their information to everyone through Web Services Description Language (WSDL), making it easy for the hacker to create the Denial of Service. XML Denial-of-Service (XDoS) is specific DoS with respect to Web services, as the medium of communication is through XML. XDoS can be achieved by any of the following ways:

By flooding the network with XML messages thereby not allowing legitimate network traffic.

By flooding the service with XML requests, thereby not allowing the service to process any other request.

By flooding the service with junk XML requests, thereby disrupting the service and making it unavailable for other legitimate users.

Further, as will be appreciated by a person skilled in the art, the performance of a system that could provide both content checking and source based filtering is a big gap to fill. The performance related problems are answered by XML aware hardware, which provides basic XML validation and defense against XDoS. However, the cost involved in such a hardware based system is considerable. Moreover, there was a little scope to upgrade such a system with time, as XDoS is a constantly evolving attack mechanism. For a simple packet based attack, bandwidth management and intelligent filtering provides the needed line of defense. However, these traditional security devices do not differentiate between good and bad XML. Moreover, IP based source filtering does not suffice when the security credentials are set in the SOAP header, and a user can use different IPs at different times.

Therefore, there is a need for a system and method to address these issues and detect and prevent XDoS attacks by providing a framework over and above the existing security infrastructure and on the level of an application.

SUMMARY OF THE INVENTION

The above and other needs are addressed by the present invention which provides a method, system, and software for preventing network service attacks, including an exemplary framework designed to detect an attack and automatically start preventive mechanisms. In further exemplary embodiments, various possible attack scenarios that are possible on a Web service, and the motivation and background for the exemplary framework, including an exemplary PreSODos framework with respect to detecting XDoS attacks, are described. Still further exemplary embodiments relate to extension mechanisms for the exemplary framework to support further security threats, including viruses, worms, and the like.

Accordingly, in an exemplary aspects there is provided a method, system, and computer program product for preventing network service attacks, including processing a message to validate the message for message version and syntax via a security firewall; canonicalizing the message and extracting a message header and body via a converter; converting the body into a Patricia Trie via the converter; and validating the header and the converted body for security via a comparator.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

Figure 1:
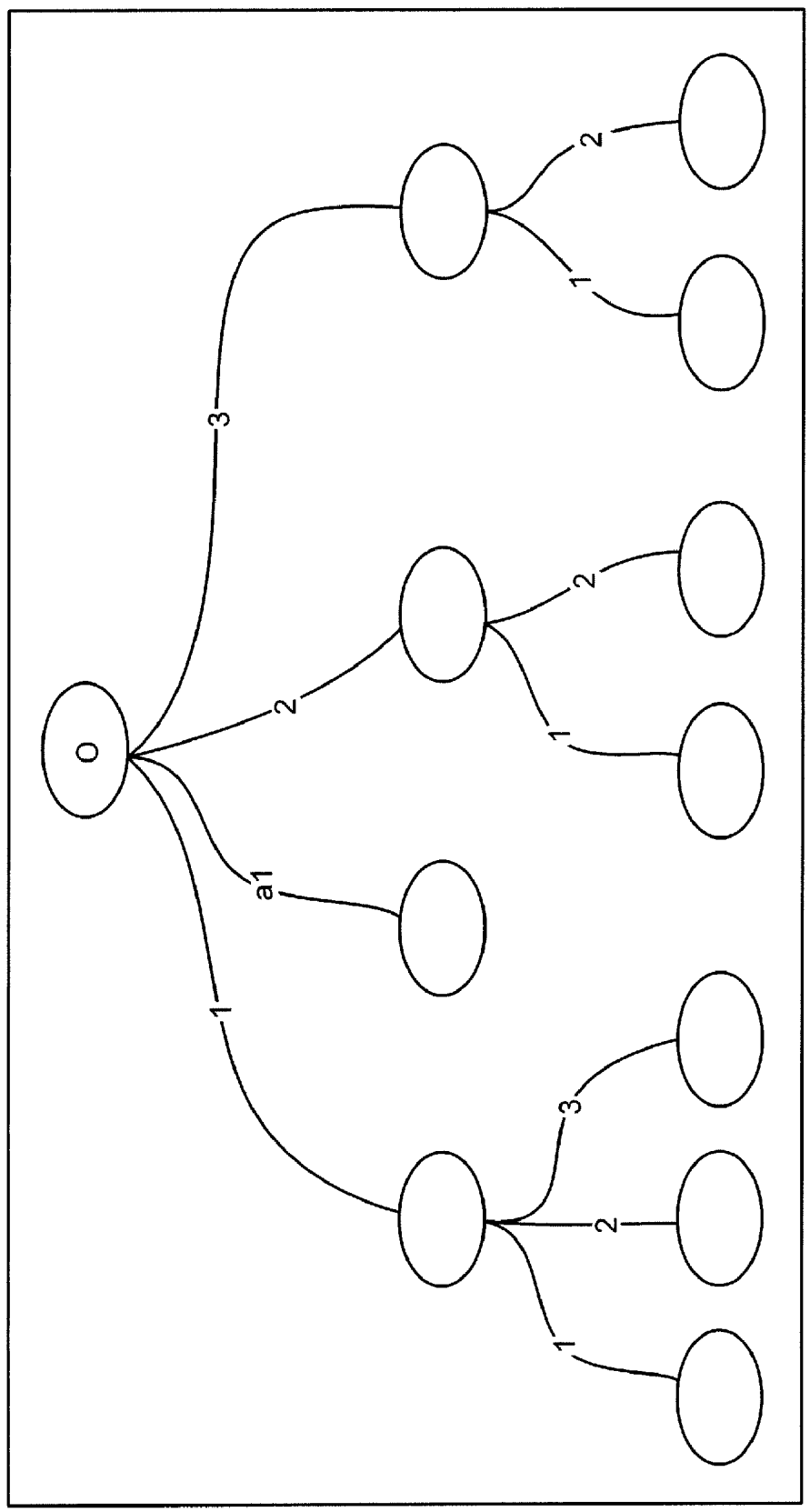
FIG. 1 illustrates an exemplary Patricia Trie representation, according to an exemplary embodiment.
Figure 2:
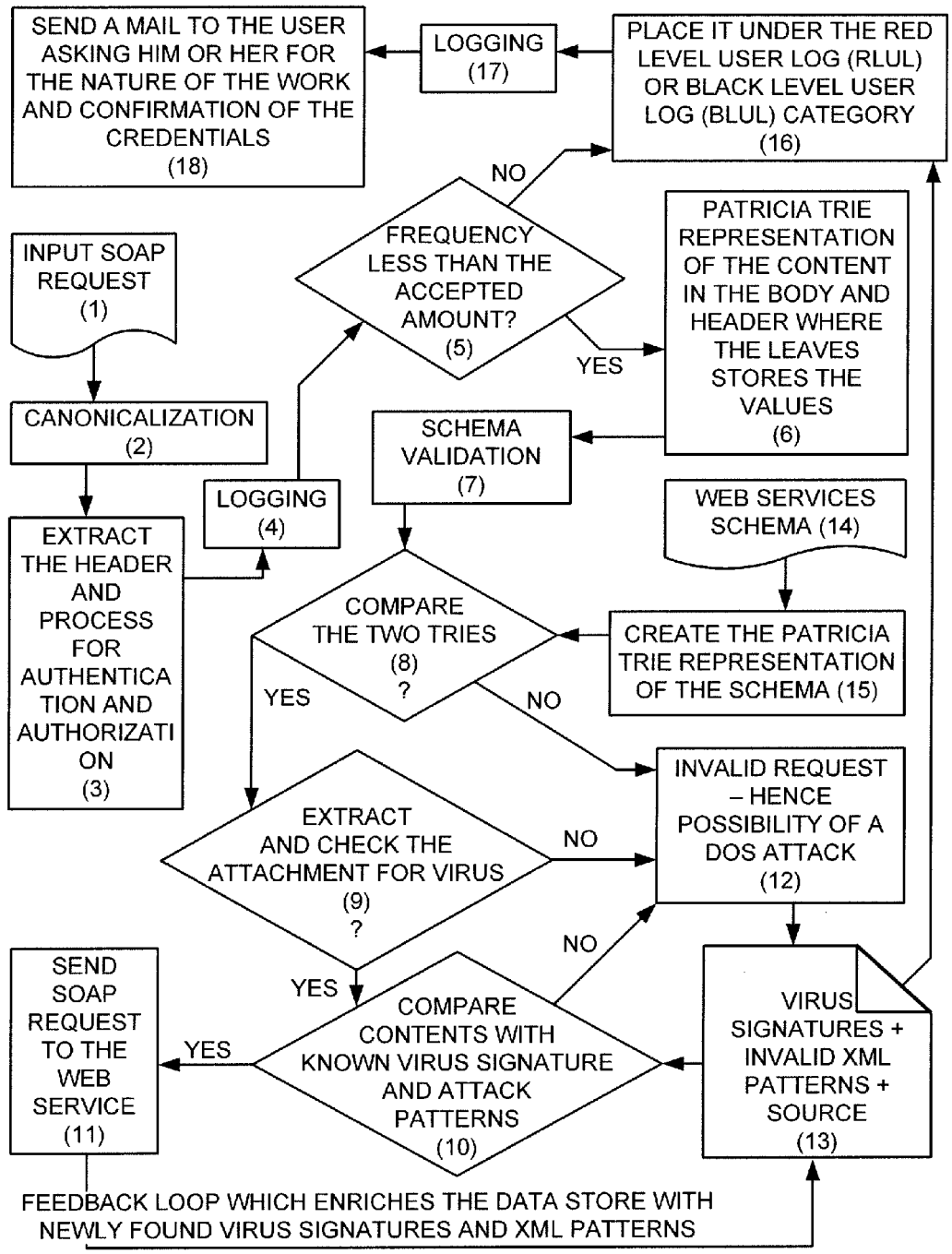
FIG. 2 illustrates an exemplary process flow for preventing network service attacks, according to an exemplary embodiment.
Figure 3:
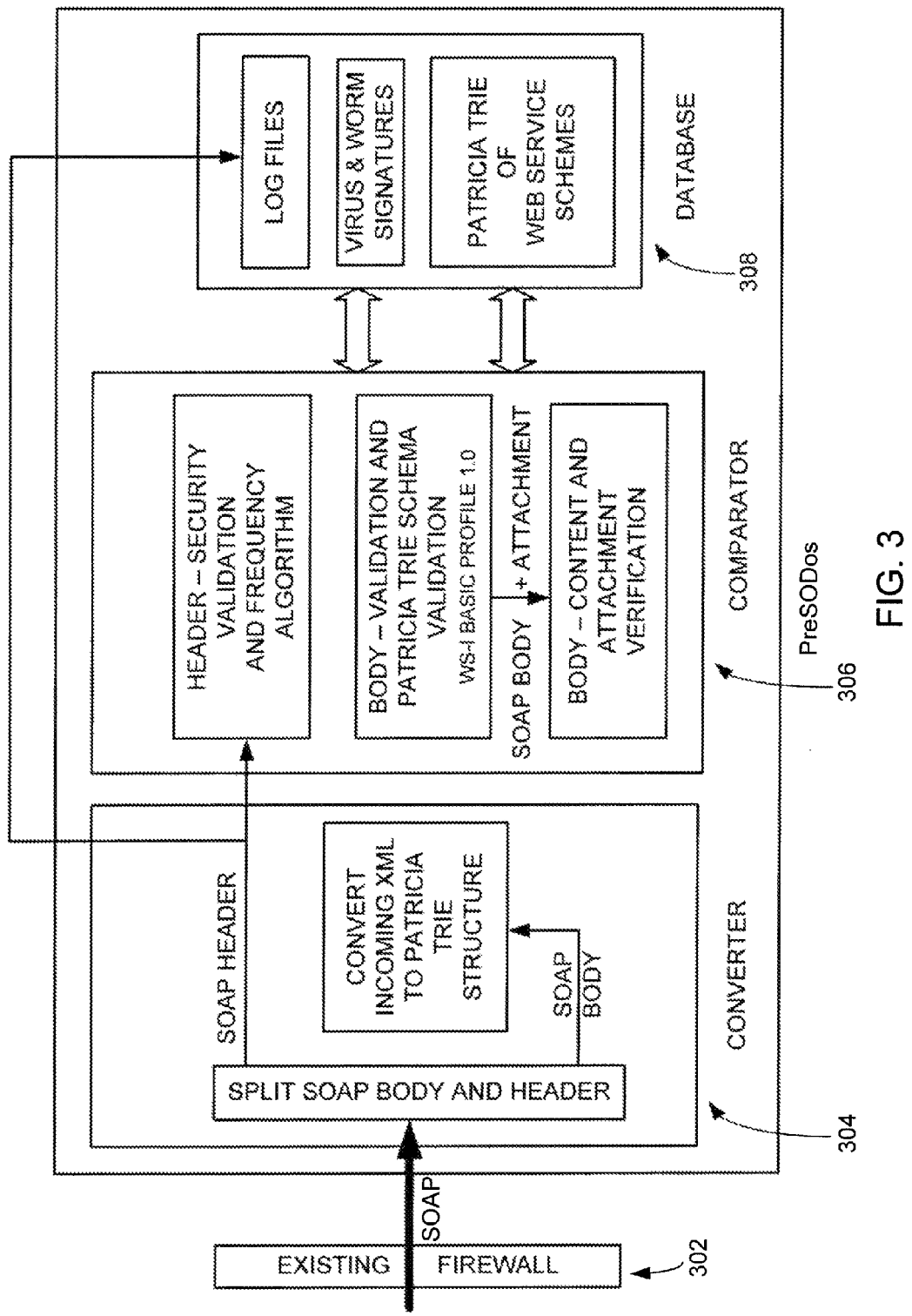
FIG. 3 illustrates an exemplary architecture for preventing network service attacks, according to an exemplary embodiment.

Example Referring now to the drawings, wherein like reference numerals designate identical or corresponding parts throughout the several views, and more particularly to FIGS. 1-3 thereof, which will be used to illustrate a method, system, and software for preventing network service attacks, accordingly to exemplary embodiments.

Attack Scenarios in Web Services

Web services are standard based applications that can be dynamically found over a network and are bound and invoked using standards based call mechanisms. XML is the standard on which all the other standards rely for their definition in the web services world. Various standards, such SOAP, WSDL, Schema, and the like, can be built over XML. XML is a simple text based data representation. The simplicity and extensibility are the key features of the XML that make it a universal medium of data exchange for web services which implement SOA. Over time, XML became richer and more extensible by trying to provide an interoperable data exchange pattern between all platforms and technologies. However, with this evolution there were many gaps and vulnerabilities that crept into it. These gaps and vulnerabilities are used or can be used in the future to attack web services based applications. The following section illustrates some of these vulnerabilities that can allow a person to bring down a network service, for example, by using XDoS.

Buffer Overflow Attack

A hacker can execute a hostile code on the server through the web service causing the allocated buffer to overflow. This can result in DoS. Such an attack can be done by embedding certain code that gets bloated when loaded in the memory. For example, when a DOM parser is used, even a simple request with huge amount of data can overflow the memory, because of the nature of DOM parser, which uploads the entire XML document in the memory before parsing. The effect is multiplied when a similar attack is done on several services on the same server simultaneously. An intelligent hacker can send hostile code as a value for an element that has no maximum limit restriction, and if this value is directly used as a parameter to run a backend method, it will execute that code embedded in the value. This code might just upload the request message in the buffer in an infinite loop, hence causing a buffer overflow.

Entity Expansion

An attacker can make an XML explode in memory by using the nesting capability of XML. There is no restriction on the level of nesting, and this property can be called in a recursive way, exhausting CPU cycles and hence blocking the service from processing other legitimate requests causing XDoS. This phenomenon is popularly known as "XML Bombing." Even today, when XML schema is used in place of Document Type Definitions (DTD), internal referencing is allowed and an attacker can use this property to create a nesting of calls to internal entities or files, thereby exhausting the useful resources of the server. Any such attack on all or several services simultaneously can cause XDoS.

External Entity Reference

According to the XML schema specification, an entity can reference an entity or namespace in an external schema. This property can be used by attackers to refer to an element at external location which is not checked by the XML firewalls. At the external location, the hacker could sit and put the reference in a loop. This will force the parser to keep looking for the referenced location. thereby eating up the CPU cycles. This can also allow the attacker to load arbitrary code from the referenced location which can get executed in memory, thereby causing XDoS.

Oversized Payload

Since a SOAP message can wrap any type of data, file size capacity normally is kept very high or not declared at all while deploying web services. In such a case, an attacker can overload the parser by sending very large size SOAP messages. The attack is even easier for services which accept SOAP messages with an attachment. Currently there is no restriction on the type, number and size of attachments for a web service. Accordingly, each request with large number of attachments will take considerable time to process. If not checked internally during processing of the message, any junk can be sent as attachments. In such cases, an attacker can upload garbage or malicious content in the attachment and flood the server. This kind of attack simultaneously deployed even on few services can cause XDoS.

Unicode Attack

One of the major reasons for the success of XML was its Unicode Standards, which provide unambiguous encoding of the content of plain text for all the languages in the world. This provided multiple representations of the same character in different encoding styles. However, this also added vulnerability to XML that can be targeted by an attacker who can send same requests to a service, but in different Unicode styles, thereby making the XML firewall perceive it as different requests, and thus bypassing the security firewall that would have blocked it as a repetitive request. Such a repetitive requests can a cause XDoS attack.

Thus, there are many simple, but powerful, ways that can be used to cause XDoS. It will be almost impossible to detect all such vulnerabilities which can be targeted by attackers. However, a closer look into the problem reveals that XDoS is part of a bigger problem. For example, all the above mentioned vulnerabilities can be capitalized by an attacker only when he or she has at least some knowledge about the internal systems of the application. Attackers normally hit a service with arbitrary data and in return keep getting error messages. These messages act as a window to the application and over time an intelligent attacker is able to get some information about the application, such as the application server, SOAP engine, and the like. This is called Intrusion. Equipped with this knowledge, the next step for the attacker is to know the existing vulnerabilities in the system and use them to attack the application. Hence, one should intelligently restrict such access. It will be easy to defend the services against known attack patterns, but with the advancement of the web, even the hackers are getting smarter and discovering new gaps and inventing different ways to attack. Thus, one of the most important points that any security framework should try to address is the prevention against not only known attack patterns, but also all possible attack patterns.

Canonical XML

Listing 1: A Sample XML

```
<?xml version="1.0" encoding="utf-8"?>
<doc> <xmlns:a = http://myexample.com"
xmlns="http://defult.com">
<numbers n2=1 n1 =2>Numbers</numbers>
</doc>
```

Listing 2: Listing 1 Represented in Another Form

```
<?xml version="1.0" encoding="ISO-8859-1"?>
<doc> <xmlns:a = http://myexample.com"
xmlns="http://defult.com">
<numbers
n2=1 n1 =2>
Numbers</numbers>
</doc>
```

The purpose of finding the canonical (or simplified) form of an XML document is to arrive at a minimal form so as to determine logical equivalence between XML documents. After Canonicalization, the XML shown in listing 1 and listing 2 will look as in listing 3.

Listing 3 Canonical Form of Listing 1 & Listing 2

```
<?xml version="1.0" encoding="UTF-8"?>
<doc> < xmlns="http://defult.com" xmlns:a =
"http://myexample.com" >
<numbers n1=2 n2 =1>Numbers</numbers>
</doc>
```

Patricia Trie

To address performance issues, employed is a mechanism to store all the information available in a schema, yet provide faster access to elements and provide quick and efficient comparison between two XML documents for validation. Accordingly, in an exemplary embodiment a Patricia Trie, an efficient data structure, is leveraged along with Abstract Syntax Notation (ASN) to create a robust structure to represent XML based data, as further explained in detail below.

PATRICIA stands for "Practical Algorithm to Retrieve Information Coded in Alphanumeric." It is a form of a compressed tree, which merges single child nodes with their parents. For example, if there are two strings, such as abcde and abccc, then the Patricia Trie would have abc as one element and de and cc will be two different leaves. In a Patricia Trie, looking up a key of length n in a worst case scenario takes only $O(n)=O(1)$ time. The other options, such as a Binary Search Tree (BST) will take $O(\log n)$ time, as it is dependent on the depth of the tree, which is logarithmic in the number of keys. A Patricia Trie provides a flexible means of storing, indexing and retrieving information, and which is economical in index space and rendering time. It provides efficient and linear time solutions to the problems of complex string search, including string prefix search.

SOAP Header and Body Manipulation

When the Web Service Interoperability Organization (WS-I) came up with the Web Services basic Security Profile, the aim was to come up with a standard way in which service providers and consumers can exchange the security related data without changing the interoperability features. Basic Security Profile 1.0 specifies that all security related data should be placed in the SOAP header. The SOAP header contains the security tokens used for authenticating and authorization. It may also contain time stamps and various other security related information. The SOAP body contains the actual message intended for the ultimate endpoint, (e.g. web service). Structure and composition of elements within the SOAP body are defined by a web service using the schema, which is embedded in the WSDL of the service. The exemplary framework of the present invention looks into the contents of both the SOAP header and the SOAP body to prevent XDoS attacks. The SOAP header can be used to analyze the source and frequency of the request message and the SOAP body can be used for content verification.

A Typical Web Services XDoS Attack

A DoS attack on a Web service is different from other online applications. In an online application, the mode of attack is mostly at packet level, where an attacker floods the server with malicious packets and the server is not able to process genuine packets from the network.

Listing 4: Sample XML Message

```
<Message size=" ">
    <Head>
        <IP></IP>
        <From></From>
        <To></To>
    </Head>
    <Body>
        <Subject></Subject>
        <MainBody></MainBody>
    </Body>
    <Stamp>
        <Time></Time>
        <Date></Date>
    |</Stamp>
</Message>
```

An XDoS attack can happen on a Web service that takes input, as given in Listing 4, according to the schema given in Listing 5. The schema does not declare any restriction on the maximum size of the data that can be embedded in any of the elements. Once the Web service is deployed on a server, the WSDL is readily available. A person intending to create an XDoS on the Web service can add a large value (e.g., a picture encoded in Base64 encoding) as the text value of element MainBody. Once such a request enters the server and the request is parsed and the value of the MainBody is uploaded in the main memory, the Base64 encoded data bloats. This leads to an XDoS attack.

Listing 5: XML Schema

```
<?xml version="1.0" encoding="utf-8"?>
<xs:schema id="Message" xmlns=" " xmlns:xs="http://www.w3.org/2001/XMLSchema"
```

Listing 5: XML Schema

```
xmlns:msdata="urn:schemas-microsoft-com:xml-msdata">
  <xs:element name="Message" msdata:IsDataSet="true">
    <xs:complexType>
      <xs:choice maxOccurs="unbounded">
        <xs:element name="Head">
          <xs:complexType>
            <xs:sequence>
              <xs:element name="IP" type="xs:string" minOccurs="0" />
              <xs:element name="From" type="xs:string" minOccurs="0" />
              <xs:element name="To" type="xs:string" minOccurs="0" />
            </xs:sequence>
          </xs:complexType>
        </xs:element>
        <xs:element name="Body">
          <xs:complexType>
            <xs:sequence>
              <xs:element name="Subject" type="xs:string" minOccurs="0" />
              <xs:element name="MainBody" type="xs:string" minOccurs="0" />
            </xs:sequence>
          </xs:complexType>
        </xs:element>
        <xs:element name="Stamp">
          <xs:complexType>
            <xs:sequence>
              <xs:element name="Time" type="xs:string" minOccurs="0" />
              <xs:element name="Date" type="xs:string" minOccurs="0" />
            </xs:sequence>
          </xs:complexType>
        </xs:element>
      </xs:choice>
    </xs:complexType>
  </xs:element>
</xs:schema>
```

PreSODoS-XDoS Framework

In what follows, the logical steps in the exemplary framework of the present disclosure are described in detail. A first step in deploying and using the present framework is to create the repository of Patricia tries of the schema for all the services. After the creation of the repository of Patricia Tries, the exemplary framework is deployed and it starts intercepting the request messages. This assumes that there already exists an enterprise security framework and that a Preventing Service Oriented Denial of Service (PreSODoS) can be deployed over it. This further assumes the existence of a database containing user details and authorization information, and that authentication can be handled by the existing security mechanisms.

Creating Patricia Trie

A schema of a Web service has a root element and subsequent child elements and sub-child elements in a hierarchical structure. One can employ ASN for each element and represent it in a Patricia Trie. To be able to store the information in the schema in a lossless manner, one can use two tables along with the Patricia Trie—one for storing the element names and its ASN, as shown in Table 1, and another table for storing the ASN as a primary key along with other information about data type, field restrictions, number of occurrences, and the like, about the elements.

TABLE 1

| ASN | Element |
|---|---|
| 0 | Message |
| 1 | Head |
| 1.1 | IP |
| 1.2 | From |
| 1.3 | To |

TABLE 1-continued

| ASN | Element |
|---|---|
| a1 | Size |
| 2 | Body |
| 2.1 | Subject |
| 2.2 | MainBody |
| 3 | Stamp |
| 3.1 | Time |
| 3.2 | Date |

Now the only information that is left to capture is the hierarchy of elements in the schema. For this, one can choose the ASN in such a way that it stores the hierarchy of the elements in the schema. For example, let 0 represent the root element of the schema. The next level of elements, i.e., the child elements of the root are represented as 1, 2, 3, 4, . . . and so on. The child elements of the first child of root, i.e., element with ASN as 1, is represented in Patricia as 1, 2, 3, 4 . . . and so on, as shown on FIG. 1, but the ASN stored in the table for them becomes 1.1, 1.2, 1.3, 1.4, . . . , as shown in Table 1. Similarly, for the second child with ASN as 2, the child elements are represented in Patricia as 1, 2, 3, 4, . . . , but the ASN is stored in the table as 2.1, 2.2, 2.3, 2.4, . . . , and so on. Now, one has all the information about the elements in the schema, along with their hierarchical positions. For example, a typical Patricia Trie created in the manner as described above for the schema in listing 5 is shown in FIG. 1.

For attributes, the same convention is used, but each value is preceded by the letter "a." For example, the attributes for a root element can be a1, a2, a3, . . . and similarly the attributes for element with ASN as 3 can be represented in Patricia and will be a1, a2, a3 . . . and the ASN stored in the table will be a3.1, a3.2, a3.3, . . . . In Patricia, the elements form the branches and sub-branches of the tie.

Patricia is chosen as the XML representation scheme, rather than other tree structures, for example, because:

A Patricia representation makes searching of an element very efficient and quick and hence validation becomes efficient as each element can be traversed quickly.

There is compression of data, so there is minimal overhead in storing the schema and request message.

A SOAP request might not always have all the elements declared in the schema, as there might be several non-compulsory elements. In such a case, the nodes with those elements can be simply removed and a comparison can be done.

For content validation of selected elements of the SOAP body, one finds the exact location of the element. Patricia makes it easy to locate the element.

Logging

Before deploying PreSODoS, a logging mechanism can be put in place. For example, two logs can be used specifically for PreSODoS:

1. Red Level User Log (RLUL); and
2. Black Level User Log (BLUL).

FIG. 2 illustrates an exemplary process flow for preventing network service attacks, according to an exemplary embodiment. As shown in FIG. 2, the SOAP request is received and input in step 1, whereby the logs can store the SOAP headers, time stamps, SOAP body, and the like. Now, the exemplary framework can be deployed.

Once PreSODoS is deployed with existing security mechanisms in place, it intercepts every request message and follows the process, as described in following sections. For example, the flow inside the exemplary framework is as shown in FIG. 2.

Canonicalization

As the message enters the exemplary framework, it is first cannonicalized into the standard format, as shown at step 2 in FIG. 2. All the content based processing of the exemplary framework is based on the Canonical XML format. This is advantageous as it directly prevents potential threats from the Unicode based attacks.

Header Processing

After the canonicalization step of the request SOAP message, the SOAP header is extracted from the message, as shown at step 3 in FIG. 2. The user credentials are checked and verified using the existing security mechanism, as shown in step 3. The user is also authenticated and authorized using the existing security mechanism. The request is then allowed to move to the next step only after successful authorization and authentication. Every request header is stored or logged in a database, as shown in step 4. In case the check fails, the user token/username, current timestamp and name of the service that is being invoked are logged into the BLUL, as shown at step 4. Once the values are stored, the next step is to verify the request frequency of the SOAP request.

Request Frequency

The amount of time which has lapsed between the last invocation and the current invocation for the same request service by the same user is compared by the present system. Step 5 in FIG. 2 depicts the frequency checking condition in which it is determined whether the frequency of the request is less than an accepted amount. There are two levels of threshold time gaps, a Red Level Threshold Value (RLTV), and a Black Level Threshold Value (BLTV), both configurable at the time of deployment. All the SOAP requests are allowed to the next stage (step 6) for a time gap greater than the RLTV. If the time gap is between the RLTV and the BLTV, the request is logged into the Red Level User Log (RLUL) in the back end and the user's request is allowed to the next stage. At the back end, the RLUL is analyzed by the system for a predefined time gap, depending upon the scale and nature of the service. If the system finds that the RLUL contains an entry for the same user for more than a predefined value (e.g., 5-6 request in a day), the user is added by the system to the Black Level User Log (BLUL). If the system determines that the time gap between requests is less than the BLTV, the user information and request details are stored or logged by the system in the BLUL (step 17). The request is then blocked by the system and no further requests are processed for the particular user as long as the user id is stored in the BLUL. All the users being stored in the BLUL are immediately mailed and asked for credential confirmation and the nature of work before resuming services to them (step 18). This makes sure that the exemplary framework system keeps a proactive role on the way requests are coming into the server at the user level, hence defending against any chances of intrusion and also making tracing back easy as regular confirmations and credential checks are done. This will not allow any attacker who may have gotten hold of the user information from illegitimately attacking the system as a legitimate user.

If a user needs an access frequency that falls below the RLTV or BLTV, then user needs to get special permission from the system administrator. Permission should only be given to a trusted party and for a fixed time period. As long as the user has permission, all the requests from the user can be allowed.

It is important that the values of RLTV and BLTV are selected intelligently. If they are chosen very high, all the requests including illegitimate requests will pass the security framework. In contrast, if the values are chosen very low, even legitimate requests will also the blocked, causing user discomfort and poor QoS. It is advisable that before configuring the values, appropriate test runs are done. For configuring the value of the RLTV, one can call the service manually in a control environment from different programs with the same user credential and hit it multiple times manually and then take the weighted average mean of all such times, as given by:

$$xt=(f1 \times x1+f2 \times 2+f3 \times 3+\ldots)/(f1+f2+f3+\ldots)$$

Similarly, for configuring the BLTV, one can try to invoke the service from different sources in a program loop where multiple calls are made programmatically. This helps in stimulating the situation where the attackers flood the service at a very high rate using automated programs that call the service in a loop. Using the same formula as above, a weighted mean value should be taken after several rounds of test attacks. This will make the parameter values realistic.

Processing Body

So far, the exemplary framework ensures that no unauthenticated or unauthorized user or an attacker tampering with the header can get into the system. No user can create an XDoS attack just by flooding requests to the service. However, this only stops a part of the attacker community. For example, there are attacks that are possible by intelligently using the SOAP body sending code or references causing XDoS. In this case, the exemplary framework tries to detect such attacks and prevent them from creating XDoS attacks.

Validating Soap Body

To validate the SOAP body, a Patricia Trie is created from the request body of the SOAP request, as shown in step 6 in FIG. 2. Using the table that stores the ASN value and the name of the element, one can create a similar type of Patricia Trie as the one created for the schema associated with the algorithm discussed in earlier sections. Now the new Patricia Trie should either be the same or a subset of the Patricia Trie created from the schema for the web service. It can be a sub set, as all the elements present in the schema may not be compulsory. Such comparison is easier and much faster. This operation validates the structure of the request body. Any deviation of the structure of request message invalidates the request message and it is blocked. The user information is entered in BLUL.

Content Checking

After the schema validation in step 7, every SOAP message is checked for adherence to a WS-I Basic Profile 1.0. Any request message not qualifying to the standards set in the WS-I Basic Profile 1.0 with respect to SOAP message content and XML specification is rejected. Thus, this will block request messages referencing external entities or namespaces. Values that might cause a buffer overflow or internal nesting are checked for predefined limits and if the loop exceeds the limit, the message is blocked and entered in the BLUL. This blocks attacks caused by buffer overflow, entity expansion or oversized payload. Elements defined as "any" are also checked.

After this, the request message is allowed to invoke the service. All the data collected during the header and body processing for which logging was done is fed back into the exemplary framework of the present system. For example, the information that is fed back into the systems includes:

User data for users that do not respond to confirmation mail after they were logged to BLUL.

SOAP body of requests that fail during SOAP body processing.

Feedback Data

The feedback data that enters the exemplary framework helps to enrich the exemplary framework with knowledge of known attack patterns. The users who don't respond to confirmations would be black listed by the system and not allowed to invoke any service in future. Also, the stored information of the source of blacklisted users can be used for mining a pattern in the attacks they are generating. If the sources are following some pattern, then one can be certain that there is someone trying to plan an attack on the server. This will help the security providers trace such a source using back tracing mechanisms. The SOAP body that is fed into feedback data can be analyzed separately for anomalies and one can also mine new attack patterns for XML. This is the unique feature that gears up the exemplary framework to defend against new attack patterns developed over time.

Implementation Detail

In one implementation, Apache Axis 1.1 can be used as the SOAP engine, and Tomcat 5.0 on Microsoft Windows XP (Version 5.1.2600) can be employed. For security, a WSS4J version 1.0.0 can be employed. For logging, one can use log 4j-1.2.8. All the user information and service information about the schema are stored in the MySQL database version 4.0.17. All the Web services are developed using java (j2sdk1.4.2.sub.--05). All the services are deployed on axis. One can use javamail API's to send automated emails to users. The logical component diagram and the technologies used to realize the exemplary PreSODoS architecture are shown in FIG. 3.

Initially, as shown in FIG. 3, a received SOAP message is processed by the existing security firewall 302, which validates the XML payload for the XML and SOAP (versions) and syntax. After being processed by the firewall 302, the SOAP message enters PreSODoS's converter 304. In the converter 304, the request is canonicalized and the SOAP header and body are separated from each other. The header and body are processed separately in the converter 304. The SOAP header is directly sent to the comparator 306 and also logged in the log file memory in the database 308 as discussed above. The SOAP body is converted into a Patricia Trie format and sent to the comparator 306.

In the comparator 306, the body and header are processed separately. The header is checked for security using pre-existing message level standards with existing mechanisms. Once the header validates the source, then the body is processed. The body is first checked against a standard WS-I Basic Profile 1.0. The body validation is done using the Patricia comparison of input body and the schema of the service. Here content checking is done at selective nodes, as discussed above. For the exemplary implementation of the present system, the content can be checked against some known worm signatures stored locally in the intelligent repository database 308. As shown in FIG. 3, the Patricia Trie of the web service schemes are also stored in the database 308.

Extension to the Framework

Apart from the basic XDoS prevention, PreSODoS can also be extended to detect more attacks and prevent the effects of such attacks. Further exemplary embodiments for PreSODoS are listed below and discussed in relation to FIGS. 2 and 3.

Malicious Content Inspection

There are possibilities that an attacker can intelligently place some malicious content at some vulnerable points in a SOAP body. For such attacks, the exemplary framework can be configured to detect and verify the contents at such vulnerable points. Referring to FIG. 3, after the Patricia Tries are compared in step 8, the contents of such elements are extracted and verified against the known virus or worm signatures, as shown in step 9. This can either be done with help of a local repository 308 (FIG. 3), which is updated regularly or directly from online facilities for the same. If any virus is detected, the request should be blocked immediately and the user details should be entered in the BLUL.

SOAP Attachment Filter

In the present state of Web services standardization, there is no clear cut standard provided for attachments. Owing to this, one has no standard security mechanism for filtering attachments. The exemplary framework can be extended to extract each attachment separately and verify against known virus and worm signatures. It can also provide for declaration of content type, numbers and size of attachment for a service. It can provide filtering for all the related standards, such as MIME, DIME, MTOM, and the like. When an attachment is checked with restrictions declared or known malicious content signatures, a check detects any deviation, and the request can be rejected and the request information logged in and the user added to BLUL.

In addition, the exemplary framework can be extended to detect not only simple XDoS attacks, but also XML based Distributed Denial of Service (XDDoS) attacks on Web services. Further, the XML representation technique of using a Patricia Trie can be extended to other applications to achieve performance efficiency. Also, PreSODoS currently does not cover the complete gamut of functionality of Intrusion Detection Systems (IDS), which provide means to detect ways in which information can be extracted by an attacker. PreSODoS can however provide information to IDS systems in terms of SOAP patterns and source of message, as input to IDS systems. This interface can be enriched by looking at the IDS data requirements.

Advantages

As will be appreciated by a person skilled in the art, the present invention provides a variety of advantages over conventional systems. The exemplary method uses efficient knowledge representation format Patricia Trie with savings in processing time for XML inputs. In addition, the exemplary method also saves on space required, due to not relying on full XML payload and is capable of detecting dissimilar XML documents. Further, the exemplary method has same canonical form, leading to prevention from XDOS attacks involving repeat content with dissimilar payloads yet having same canonical form.

The exemplary method is flexible with the capability for adjusting the relative gap between successive invocations to be construed as an attack. The exemplary method uses feedback mechanisms to adapt to new threats and attacks.

This data collected in the Log files (BLUL) can be used by the exemplary security framework to trace back the users that are, directly or indirectly, responsible for the attack.

A close scrutiny of the data in the log can be starting point for Intrusion detection systems (IDS), where one can store the Patricia Trie of the entire rejected request. The body of this request can open up the methods or commands that are imbedded in the XML for intrusion.

The above-described devices and subsystems of the exemplary embodiments of FIGS. 1-3 can include, for example, any suitable servers, workstations, PCs, laptop computers, PDAs, Internet appliances, handheld devices, cellular telephones, wireless devices, other devices, and the like, capable of performing the processes of the exemplary embodiments of FIGS. 1-3. The devices and subsystems of the exemplary embodiments of FIGS. 1-3 can communicate with each other using any suitable protocol and can be implemented using one or more programmed computer systems or devices.

One or more interface mechanisms can be used with the exemplary embodiments of FIGS. 1-3, including, for example, Internet access, telecommunications in any suitable form (e.g., voice, modem, and the like), wireless communications media, and the like. For example, the employed communications networks can include one or more wireless communications networks, cellular communications networks, 3 G communications networks, Public Switched Telephone Network (PSTNs), Packet Data Networks (PDNs), the Internet, intranets, a combination thereof, and the like.

It is to be understood that the devices and subsystems of the exemplary embodiments of FIGS. 1-3 are for exemplary purposes, as many variations of the specific hardware and/or software used to implement the exemplary embodiments are possible, as will be appreciated by those skilled in the relevant art(s). For example, the functionality of one or more of the devices and subsystems of the exemplary embodiments of FIGS. 1-3 can be implemented via one or more programmed computer systems or devices.

To implement such variations as well as other variations, a single computer system can be programmed to perform the special purpose functions of one or more of the devices and subsystems of the exemplary embodiments of FIGS. 1-3. On the other hand, two or more programmed computer systems or devices can be substituted for any one of the devices and subsystems of the exemplary embodiments of FIGS. 1-3. Accordingly, principles and advantages of distributed processing, such as redundancy, replication, and the like, also can be implemented, as desired, to increase the robustness and performance the devices and subsystems of the exemplary embodiments of FIGS. 1-3.

The devices and subsystems of the exemplary embodiments of FIGS. 1-3 can store information relating to various processes described herein. This information can be stored in one or more memories, such as a hard disk, optical disk, magneto-optical disk, RAM, and the like, of the devices and subsystems of the exemplary embodiments of FIGS. 1-3. One or more databases of the devices and subsystems of the exemplary embodiments of FIGS. 1-3 can store the information used to implement the exemplary embodiments of the present invention. The databases can be organized using data structures (e.g., records, tables, arrays, fields, graphs, trees, lists, and the like) included in one or more memories or storage devices listed herein. The processes described with respect to the exemplary embodiments of FIGS. 1-3 can include appropriate data structures for storing data collected and/or generated by the processes of the devices and subsystems of the exemplary embodiments of FIGS. 1-3 in one or more databases thereof.

All or a portion of the devices and subsystems of the exemplary embodiments of FIGS. 1-3 can be conveniently implemented using one or more general purpose computer systems, microprocessors, digital signal processors, microcontrollers, and the like, programmed according to the teachings of the exemplary embodiments of the present invention, as will be appreciated by those skilled in the computer and software arts. Appropriate software can be readily prepared by programmers of ordinary skill based on the teachings of the exemplary embodiments, as will be appreciated by those skilled in the software art. In addition, the devices and subsystems of the exemplary embodiments of FIGS. 1-3 can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware circuitry and/or software.

Stored on any one or on a combination of computer readable media, the exemplary embodiments of the present invention can include software for controlling the devices and subsystems of the exemplary embodiments of FIGS. 1-3, for driving the devices and subsystems of the exemplary embodiments of FIGS. 1-3, for enabling the devices and subsystems of the exemplary embodiments of FIGS. 1-3 to interact with a human user, and the like. Such software can include, but is not limited to, device drivers, firmware, operating systems, development tools, applications software, and the like. Such computer readable media further can include the computer program product of an embodiment of the present invention for performing all or a portion (if processing is distributed) of the processing performed in implementing the exemplary embodiments of FIGS. 1-3. Computer code devices of the exemplary embodiments of the present invention can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the exemplary embodiments of the present invention can be distributed for better performance, reliability, cost, and the like.

As stated above, the devices and subsystems of the exemplary embodiments of FIGS. 1-3 can include computer readable medium or memories for holding instructions programmed according to the teachings of the present invention and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave, or any other suitable medium from which a computer can read.

While the present invention have been described in connection with a number of exemplary embodiments and implementations, the present invention is not so limited, but rather

What we claim is:

1. A method for preventing network service attacks, the method comprising:
   processing a received message to validate the message for message version and syntax via a security firewall;
   canonicalizing at least a portion of the message and extracting a message header and a message body from the message using one or more processors;
   processing, using the one or more processors, at least a portion of the message header to determine if the message is associated with a network service attack based on frequency information between the received message and one or more other received messages;
   creating a first Patricia Trie associated with a schema of the canonicalized message body and comparing, via the one or more processors, the first Patricia Trie with a second Patricia Trie associated with a schema of a web service to determine if the schema of the canonicalized message body validates the schema of the web service in identifying whether the received message is a Denial of Service; and
   preventing access of the received message if the received message body does not validate the schema of the web service.

2. The method of claim 1, wherein the processing step includes validating the header using one or more message level standards and mechanisms.

3. The method of claim 1, wherein the message body and the message header are processed separately by the converter.

4. The method of claim 1, wherein the message comprises a SOAP message.

5. The method of claim 1, wherein canonicalizing the message comprises simplifying the message to arrive at a logically equivalent minimal form of the message.

6. The method of claim 1, wherein the comparator and the converter are separate from and external to the security firewall.

7. A system for preventing network service attacks, the system comprising:
   a security firewall configured to process a message received via a network interface, wherein the security firewall is configured to validate the message for message version and syntax;
   one or more processors configured to process a message header of the received message to determine frequency information in identifying whether the received message is a network service attack, the one or more processors configured to canonicalize at least a part of a message body of the received message, wherein the one or more processors creates a first Patricia Trie associated with a schema of the canonicalized message body; and
   the one or more processors configured to compare the first Patricia Trie with a second Patricia Trie associated with a schema of a web service to determine if the schema of the canonicalized message body validates the schema of the web service to identify if the received message is a Denial of Service network service attack wherein the one or more processors identifies the received message as a network service attack and denies access if the structure of the canonicalized message body does not validate the schema of the web service.

8. The system of claim 7, wherein the comparator is configured to process at least a portion of the message header to determine if the message is associated with a network service attack.

9. The system of claim 7, wherein the comparator is configured to validate the message header using one or more message level standards and mechanisms.

10. The system of claim 7, wherein the message body and the message header are processed separately by the comparator.

11. The method of claim 7, wherein the message comprises a SOAP message.

12. The system of claim 7, wherein the converter configuration to canonicalize the message comprises a configuration to simplify the message to arrive at a logically equivalent minimal form of the message.

13. The system of claim 7, wherein the comparator and the converter are separate from and external to the security firewall.

14. A non-transitory computer storage device tangibly embodying a plurality of instructions on a computer readable medium for preventing network service attacks, which when executed by one or more processors, causes the one or more processors to perform a method comprising the steps of:
   processing a received message to validate the message for message version and syntax via a security firewall, wherein the received message has a message header and a message body;
   canonicalizing at least a portion of the message body of the received message;
   processing at least a portion of the message header to determine if the received message is associated with a network service attack based on frequency information between the received message and one or more other received messages;
   creating a first Patricia Trie associated with a schema of the canonicalized message body and comparing, via a comparator, the first Patricia Trie with a second Patricia Trie associated with a schema of a web service to determine if the schema of the canonicalized message body validates the schema of the web service in identifying whether the received message is a Denial of Service attack; and
   preventing access of the received message if the received message body does not validate the schema of the web service.

15. The non-transitory computer storage device of claim 14, wherein the processing step includes validating the header using one or more message level standards and mechanisms.

16. The non-transitory computer storage device of claim 14, wherein body and header are processed separately by the comparator.

17. The computer storage device of claim 14, wherein the message comprises a SOAP message.

18. The non-transitory computer storage device of claim 14, wherein the instructions for canonicalizing the message comprise instructions to simplify the message to arrive at a logically equivalent minimal form of the message.

19. The non-transitory computer storage device of claim 14, wherein the comparator and the converter are separate from and external to the security firewall.

* * * * *